United States Patent [19]

Bonga

[11] 4,316,071
[45] Feb. 16, 1982

[54] EDM APPARATUS WITH TOOL CHANGER

[75] Inventor: Benno I. Bonga, Crans, Switzerland

[73] Assignee: Ateliers des Charmilles S.A., Geneva, Switzerland

[21] Appl. No.: 123,994

[22] Filed: Feb. 25, 1980

[30] Foreign Application Priority Data

Mar. 9, 1979 [CH] Switzerland .......................... 2277/79

[51] Int. Cl.³ .............................................. B23P 1/12
[52] U.S. Cl. ................................ 219/69 R; 219/69 E
[58] Field of Search ................ 219/69 R, 69 E, 69 M, 219/69 W; 269/56

[56] References Cited
FOREIGN PATENT DOCUMENTS
2816588 10/1978 Fed. Rep. of Germany ... 219/69 W Primary Examiner—C. C. Shaw
Attorney, Agent, or Firm—Hauke and Patalidis

[57] ABSTRACT

An EDM apparatus for machining by electrical discharges an electrode workpiece by one of a plurality of electrode tools individually and selectively mounted by an automatic tool changer on the apparatus electrode tool holder. The tool changer comprises a tool transfer carriage provided with a grasping mechanism adapted to take hold of electrode tool supports of diverse shapes provided with cut-out portions enabling connection with the carriage for carrying the electrode tools from a storage magazine to the electrode tool holder and back from the electrode tool holder to the magazine.

5 Claims, 4 Drawing Figures

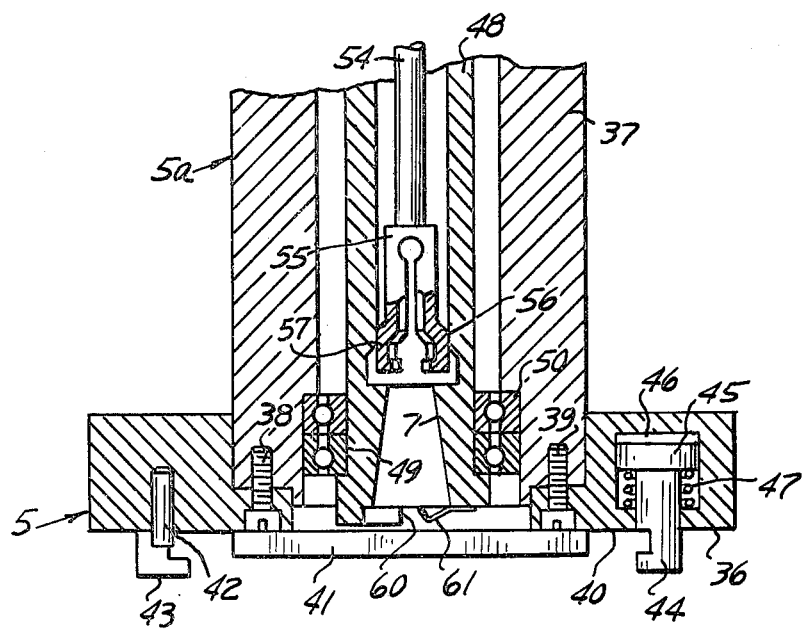
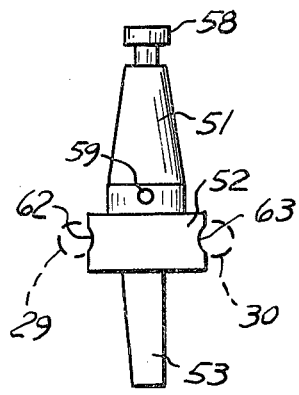
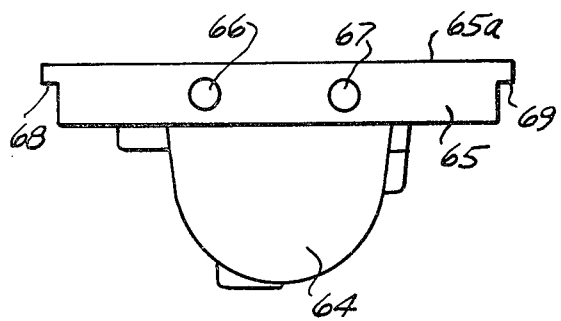

EDM APPARATUS WITH TOOL CHANGER

BACKGROUND OF THE INVENTION

The invention relates to apparatus for electrical discharge machining of an electrode workpiece by way of a plurality of electrode tools, and which comprises a storage magazine for storing the electrode tools and a movable carriage provided with support means for transporting the electrode tools between the magazine and the tool holders mounted on the end of the ram or quill of the apparatus.

It is often necessary, in order to machine a workpiece of complex shape, to use consecutively several electrode tools of different shapes, for example a large size electrode tool for sinking a cavity, and a small size electrode tool for machining a small detail in the cavity. It is known to provide an EDM apparatus, when such an operation is required, with a single electrode tool holder and to provide all the electrode tools with a matching support or mount member such that diverse sizes of electrode tools can be handled by an automatic tool changer.

However, it is very difficult to design an electrode tool holder which is convenient for holding small electrodes as well as large electrodes, and which provides constant sufficient rigidity and precision of positioning of the electrode tools irrespective of their size or shape.

SUMMARY OF THE INVENTION

The present invention permits to solve the above-mentioned problem by providing an EDM apparatus with a tool holder accepting at least two different types of electrode tool mounts of different shapes with accurate positioning, each of the electrode tool mounts having a support portion adapted to co-operate with the tool carrying members of the tool changer transfer carriage.

Such an arrangement permits to use an electrode tool mount provided with a high precision tapered shank for electrode tools of small dimensions and a mounting or adapter plate of high rigidity for electrode tools of larger dimensions. Furthermore, the use of electrode tool mounts of smaller dimensions for small electrode tools considerably decreases the space required for storing the electrode tools in the tool magazine.

BRIEF DESCRIPTION OF THE DRAWING

A better understanding of the present invention will be had by those skilled in the art when the following description of an example of the best mode contemplated for practicing the invention is read in conjunction with the accompanying drawing showing, for illustrative purpose only, an example of structure for a tool changer system according to the invention. In the drawing:

FIG. 2 is a section through the end of the apparatus ram or quill provided with the electrode tool holder of the invention; and FIGS. 3 and 4 each illustrate a different type of electrode tool mount adapted for mounting on the end of the ram or quill of FIG. 2.

DETAILED DESCRIPTION OF THE PREFERRED EMBODIMENTS

Figure 1:
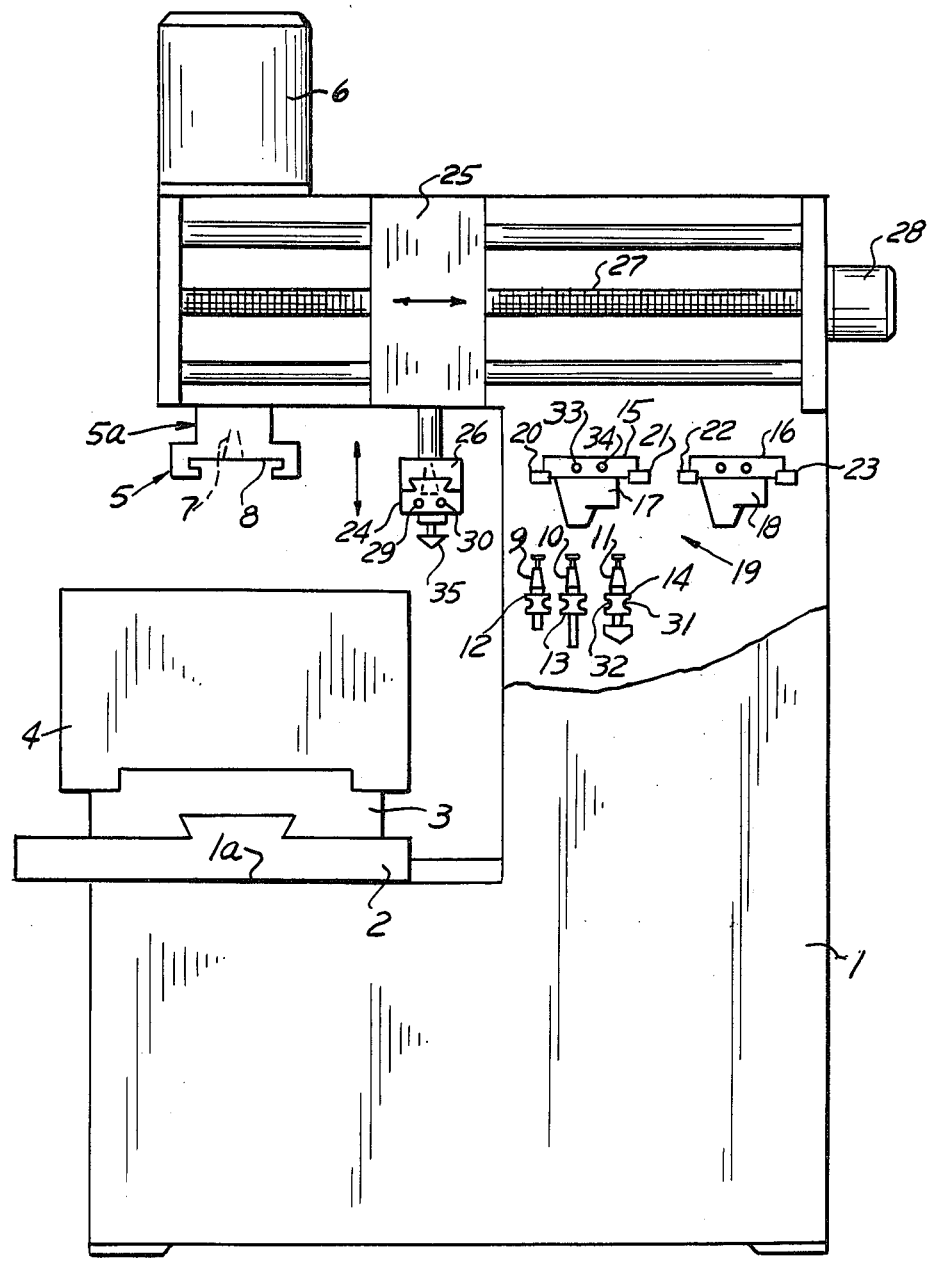
FIG. 1 schematically illustrates the general arrangement, in accordance with the invention, of an EDM apparatus provided with an automatic tool changer.

Referring to the drawing, and more particularly to FIG. 1, an EDM apparatus is illustrated which comprises a generally C-shaped frame 1 forming a table 1a on which is mounted a pair of cross-slides 2 and 3 supporting an enclosure or tank 4 in which is mounted the workpiece, not shown, to be machined by electrical discharges. In the example of structure illustrated, the frame 1 is provided at its top with an electrode holder 5 mounted on the end of a vertical quill 5a reciprocably driven linearly by a servo motor 6. The electrode holder 5 is provided with a conical bore 7 and a plane support surface 8 adapted to mate respectively with the conical shanks 9, 10 and 11 of the electrode tool mounts 12, 13 and 14 and with the planar electrode tool mounts 15 and 16 of the electrode tools 17 and 18. The electrode tools are stored in a storage magazine 19 on appropriate support racks 20–21 and 22–23. Each electrode tool is transferred from the storage magazine 19 to the electrode tool holder 5, and back, by way of a tool changer movable transfer carriage 24 displaceable vertically by a servo motor 25. The horizontal travels of the tool transfer carriage 24 are effected in directions perpendicular to the plane of the drawing by means of a servo motor, not shown, displacing the tool transfer carriage 24 relative to a slide 26 vertically displaced by the servo motor 25 and horizontally displaced in the plane of the drawing by means of a lead screw 27 driven by a servo motor 28.

The electrode tools are grabbed by the tool transfer carriage 24 by means of a pair of support arms 29 and 30 mounted horizontally on the carriage. The support arms 29 and 30 are spaced and arranged to be engageable either into lateral grooves 31 and 32 formed on the sides of the electrode tool mounts 12, 13 or 14, or in horizontal bores 33 and 34 disposed through the support plate 15 or 16 of the electrode tools 17 or 18, respectively. At FIG. 1 an electrode tool 35 provided with a tapered mounting shank is shown in the process of being transported by the transfer carriage 24, supported by the carriage carrying arms 29 and 30.

FIG. 2 shows in detail the structure of the electrode tool holder 5 of FIG. 1. The quill 5a is provided with a holder plate 36 mounted at the end of the quill, which is in the form of a tubular member 37, by means of bolts or screws 38 and 39. The lower face of the holder plate 36 comprises a horizontal reference surface 40, a vertical reference surface 41 and a pin 42 which all co-operate for providing a three-axis positioning reference for the mounting plate of a large electrode tool such as the electrode tools 17 or 18 of FIG. 1, or 64 of FIG. 4. The face of the electrode tool mounting plate, such as the face 65a of the electrode tool mounting plate 65 of FIG. 4 for example, is urged against the support reference surface 40 by the hook-like clamp members 43 and 44. Each of the hook-like clamp members 43 and 44 is displaced by a piston 45 as a result of pressurized fluid being introduced in a cylinder chamber 46 on one side of the piston, or alternatively by an electrically operated solenoid, for releasing the electrode tool mounting plate, and is urged by a spring 47 in the direction clamping the electrode tool mounting plate in the support plate 36 when fluid pressure is removed from the chamber 46, or when the solenoid is de-energized.

A preferably rotatable quill 48 is mounted within the tubular member 37, being supported coaxially therein by ball bearings 49 and 50. The quill 48 is provided at its lower end with a tapered bore 7 accepting the tapered mounting shank of an electrode mount, such as the electrode mount 52 for the electrode tool 53 illustrated at FIG. 3.

The rotatable quill 48 is tubular and is provided in its interior with a rod 54 on the lower end of which is mounted an expandable chuck or collet 55 having a plurality of flexible arms 56–57 arranged such as to clampingly close over the enlarged end portion 58 of the tapered shank 51 of the tool mount 52 when the rod 54 is displaced upwardly. When the rod 54 is displaced downwardly, the arms 56–57 spread apart and free the enlarged portion 58 at the end of the tapered shank 51. The accurate angular positioning of the electrode tool 53 is obtained by a radial pin 59 which abuts against a reference surface 60 disposed at the lower end of the tapered bore 7 of the rotatable quill 48. A bent leaf spring 61 urges the pin 59 in engagement with the reference surface 60. The peripheral surface of the electrode tool mount 52 is provided with parallel grooves 62 and 63 engageable by the arms 29 and 30 of the tool transfer carriage 24 of FIG. 1.

FIG. 4, as previously indicated, illustrates an electrode tool 64 of large size requiring a mounting plate 65 arranged to fit in the electrode holder plate 5, FIG. 2, by means of the hook-like clamps 43 and 44. The electrode tool mounting plate 65 is provided with a pair of horizontally disposed parallel bores 66 and 67 through which the carriage arms 29 and 30 are introduced when the electrode 64 is transported by the tool changer transfer carriage 24. The electrode tool mounting plate 65 is provided with a pair of marginal parallel steps 68 and 69, engageable by the support rails in the storage magazine and engageable by the clamping hooks 43 and 44 when the electrode tool 64 carried by the transfer carriage 24 is slipped into the electrode tool holder 5 with the electrode tool mounting plate 65 disposed in the holder plate 36 against the locating surface 41 and the locating pin 42.

After machining a workpiece by means of the electrode 64, the electrode 64 is replaced, for example, by an electrode such as the electrode 53 by means of the tool changer described hereinabove.

Having thus described the present invention by way of an example of structure, modification whereof will be apparent to those skilled in the art, what is claimed as new is as follows:

I claim:

1. An EDM apparatus for machining by electrical discharges an electrode workpiece by means of a plurality of electrode tools, said apparatus comprising a quill adapted to mount any one of said electrode tools, an electrode tool storage magazine for storing said electrode tools, a tool changer carriage for carrying said electrode tools from said storage magazine to said quill and from said quill back to said storage magazine, and electrode tool holder means on the end of said quill accepting at least two different types of electrode tool supports each in a predetermined position, said electrode tool holder means comprising at least a tapered bore and a plane support surface adapted to co-operate respectively with an electrode tool support having a tapered shank and an electrode tool support having a mounting plate wherein some of the electrode tool supports are one of said different types of supports having a tapered shank and some the other of the electrode tool supports are the other of said different types of supports having a mounting plate, and said electrode tool supports have a portion mating with tool carrying means on said tool changer carriage.

2. The apparatus of claim 1 wherein said tool carrying means is a pair of carrying arms for engaging corresponding recesses in said electrode tool supports.

3. The apparatus of claim 2 wherein said quill comprises a tapered bore and a plane support surface adapted to co-operate respectively with an electrode tool support having a tapered shank and an electrode tool support having a mounting plate.

4. The apparatus of claim 1 wherein said tapered shank has a pair of lateral recesses for engagement with said carrying arms and said support mounting plate has a pair of horizontal bores for engagement therethrough of said carrying arms.

5. The apparatus of claim 3 wherein said tapered shank has a pair of lateral recesses for engagement with said carrying arms and said support mounting plate has a pair of horizontal bores for engagement therethrough of said carrying arms.

* * * * *